(12) United States Patent
Yao et al.

(10) Patent No.: US 12,234,806 B2
(45) Date of Patent: Feb. 25, 2025

(54) FREQUENCY SUPPORT METHOD, DEVICE AND WIND FARM FOR WIND FARM

(71) Applicant: HUAZHONG UNIVERSITY OF SCIENCE AND TECHNOLOGY, Hubei (CN)

(72) Inventors: Wei Yao, Hubei (CN); Hongyu Zhou, Hubei (CN); Kangyi Sun, Hubei (CN); Xiaomeng Ai, Hubei (CN); Jinyu Wen, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/407,274

(22) Filed: Jan. 8, 2024

(65) Prior Publication Data

US 2025/0035085 A1    Jan. 30, 2025

(30) Foreign Application Priority Data

Jul. 25, 2023   (CN) .......................... 202310927146.X

(51) Int. Cl.
*F03D 7/02*      (2006.01)
*F03D 7/04*      (2006.01)
*H02J 3/38*      (2006.01)
*H02J 3/46*      (2006.01)

(52) U.S. Cl.
CPC .......... *F03D 7/0284* (2013.01); *F03D 7/048* (2013.01); *H02J 3/381* (2013.01); *H02J 3/46* (2013.01); *F05B 2270/1033* (2013.01); *H02J 2300/28* (2020.01)

(58) Field of Classification Search
CPC .......... F03D 7/0284; F03D 7/048; H02J 3/46; H02J 3/381; H02J 2300/28; F05B 2270/1033
See application file for complete search history.

*Primary Examiner* — Sean Gugger
(74) *Attorney, Agent, or Firm* — JCIPRNET

(57) ABSTRACT

The disclosure provides a frequency support method, device and wind farm for a wind farm and belongs to the technical field of new energy power generation and grid connection. In the frequency support method, a state that can reflect a frequency modulation capability of a wind turbine is designed, measured, and recorded as a consistency factor of frequency modulation. Each wind turbine is controlled to exchange the consistency factors with two adjacent wind turbines. Each wind turbine combines its own consistency factors with the consistency factors of two adjacent wind turbines to generate consistent added power through a PI link and adjusts real-time frequency modulation output based on the consistency added power. In this way, the states of the wind turbines in the wind farm are similar during the frequency support process, so that a reasonable distribution of frequency support power is achieved.

17 Claims, 3 Drawing Sheets

Without consistency control    With consistency control

FREQUENCY SUPPORT METHOD, DEVICE AND WIND FARM FOR WIND FARM

CROSS-REFERENCE TO RELATED APPLICATION

This application claims the priority benefit of China application serial no. 202310927146.X, filed on Jul. 25, 2023. The entirety of the above-mentioned patent application is hereby incorporated by reference herein and made a part of this specification.

BACKGROUND

Technical Field

The disclosure belongs to the technical field of new energy power generation and grid connection, and in particular, relates to a frequency support method, device and wind farm for a wind farm.

Description of Related Art

In recent years, wind power has become a focus of renewable energy. In many countries, including China, wind turbines are required to have the capability to support the frequency of the grid, that is, the capability of frequency modulation. Affected by geographical distribution, wind speed, and wind direction, the rotational speeds of wind turbines at different locations in one wind farm are different. Therefore, different wind turbines have different frequency modulation capabilities. If a uniform frequency modulation strategy is adopted, it is possible that a wind turbine with weak frequency modulation capability may have excessive frequency modulation output and then exit operation early.

Most of the wind turbines in the current wind farms adopt grid-following control schemes with current source characteristics. After the grid frequency event occurs, the rotor speed is controlled through additional droop control or inertia control, and the rotor kinetic energy is released or absorbed to participate in frequency modulation. As the grid-connected capacity of new energy increases, the short-circuit ratio of the power systems decreases and the strength of the power grids weakens. Simple grid-following wind farms are difficult to operate stably under weak power grids. Therefore, an increasing number of grid-forming wind turbines with synchronous generator characteristics are connected to the wind farms, and wind farms that are mixed with grid-following and grid-forming wind turbines are formed. Since there are significant differences in the control schemes of the grid-following wind turbines and grid-forming wind turbines, the two have independent frequency modulation in the existing scheme, and it is difficult to unify their frequency modulation strategies.

Therefore, in a wind farm containing a grid-forming wind turbine, if the grid-following or grid-forming wind turbines can reasonably allocate frequency modulation power according to their own frequency modulation capabilities, the overall frequency modulation capability of the wind farm will be improved.

SUMMARY

In response to the above defects or the needs for improvement, the disclosure provides a frequency support method, device and wind farm for a wind farm, aiming to design a state that can reflect a frequency modulation capability of each wind turbine and record as a consistency factor of frequency modulation, control each wind turbine to exchange the consistency factors with two adjacent wind turbines, allow each wind turbine to combine its own consistency factors with the consistency factors of two adjacent wind turbines to generate consistent added power through a PI link and to adjust real-time frequency modulation output based on the consistency added power, so that the states of the wind turbines in the wind farm are similar during the frequency support process, leading to a reasonable distribution of frequency support power is achieved, a lowest point of the grid frequency is prevented from increasing when the wind turbine output is excessive, and the technical problem of excessive wind turbine output due to poor overall frequency modulation capability of the current wind farms is therefore solved.

To achieve the above, in an aspect of the disclosure, the disclosure provides frequency support method for a wind farm, and the method includes the following steps.

In S1, wind turbines in the wind farm are sorted. The wind farm includes a grid-forming wind turbine with a phase angle generated by an active power loop.

In S2, a grid-connected bus frequency and a rotational speed of each of the wind turbines are detected in real time, and consistent frequency support control is started when the grid-connected bus frequency is not within a safe range formed by a first frequency threshold value and a second frequency threshold value.

In S3, a consistency factor of downward frequency modulation is calculated based on a real-time rotational speed and rotational speed upper and lower limits of each wind turbine when the grid-connected bus frequency is greater than the first frequency threshold value, and a consistency factor of upward frequency modulation is calculated based on the real-time rotational speed and the rotational speed upper and lower limits of each wind turbine when the frequency is less than the second frequency threshold value.

In S4, each wind turbine is controlled to exchange the consistency factors with two adjacent wind turbines.

In S5, each wind turbine is controlled to combine its own consistency factors with the consistency factors of two adjacent wind turbines to generate consistency added power through a PI link to perform frequency support, and the consistency added power of the grid-forming wind turbine is added to the active power loop of a wind turbine controller to generate the phase angle.

In one of the embodiments, S1 includes the following.

In S11, a wind turbine is selected and numbered as 1, communication time between wind turbine No. 1 and the remaining wind turbines is tested, and the wind turbine with the shortest communication time is numbered as wind turbine No. 2.

In S12, the communication time between wind turbine No. 2 and the remaining unnumbered wind turbines is tested, and the wind turbine with the shortest communication time is numbered as wind turbine No. 3 and so on to complete the numbering of all wind turbines in the wind farm.

In one of the embodiments, S4 includes the following.

Each wind turbine is controlled to exchange the consistency factors with two adjacent wind turbines on the left and right.

Herein, wind turbine No. 1 exchanges the consistency factors with wind turbine No. n and wind turbine No. 2, wind turbine No. n exchanges the consistency factors with wind turbine No. 1 and wind turbine No. n−1, and n is the total number of wind turbines in the wind farm.

In one of the embodiments, S3 includes the following.

In S31, the consistency factor of downward frequency modulation of each wind turbine is calculated through formula $$x_i = \frac{\omega_{r,i}^2 - \omega_{r,i0}^2}{\omega_{r,max}^2 - \omega_{r,i0}^2}$$

when the grid-connected bus frequency is greater than the first frequency threshold value.

In S32, the consistency factor of upward frequency modulation of each wind turbine is calculated through formula $$x_i = \frac{\omega_{r,i0}^2 - \omega_{r,i}^2}{\omega_{r,i0}^2 - \omega_{r,min}^2}$$

when the frequency is less than the second frequency threshold value,
where $\omega_{r,i0}$ is a rotor speed of wind turbine i when the consistent frequency support control of the wind farm is started, $\omega_{r,i}$ is a real-time rotor speed of wind turbine i, $\omega_{r,max}$ is a rotor speed upper limit, and $\omega_{r,min}$ is a rotor speed lower limit.

In one of the embodiments, the first frequency threshold value is set to 1.001 pu, and the second frequency threshold value is set to 0.999 pu.

In one of the embodiments, S5 includes the following.

The consistency added power of a grid-following wind turbine is added to a d-axis outer ring of the wind turbine controller to generate an active current. The phase angle of the grid-following wind turbine is provided by a phase-locked loop.

In one of the embodiments, each of the wind turbine combining its own consistency factors with the consistency factors of two adjacent wind turbines to generate the consistency added power through the PI link further includes the following.

The consistency added power $\Delta P_{ref,i}(t)$ of each wind turbine is calculated through the formula $$\Delta P_{ref,i}(t) = \begin{cases} k_{P,i}\sum_{j=i-1}^{i+1}(x_j - x_i) + k_{I,i}\int\sum_{j=i-1}^{i+1}(x_j - x_i) & (1 < i < n) \\ k_{P,i}(x_j - x_i) + k_{I,i}\int(x_j - x_i) & (i = 1; j = n, i+1) \\ k_{P,i}(x_j - x_i) + k_{I,i}\int(x_j - x_i) & (i = n; j = n-1, 1) \end{cases}$$

where $k_{p,i}$ is a proportional coefficient of a PI controller, and $k_{I,i}$ is an integral coefficient of the PI controller.

According to another aspect of the disclosure, the disclosure further provides a frequency support device for a wind farm, and the device includes a sorting module, a detection module, a calculation module, a control module, and a support module.

The sorting module is configured to sort wind turbines in the wind farm. The wind farm includes a grid-forming wind turbine with a phase angle generated by an active power loop.

The detection module is configured to detect a grid-connected bus frequency and a rotational speed of each of the wind turbines in real time and start consistent frequency support control when the grid-connected bus frequency is not within a safe range formed by a first frequency threshold value and a second frequency threshold value.

The calculation module is configured to calculate a consistency factor of downward frequency modulation based on a real-time rotational speed and rotational speed upper and lower limits of each wind turbine when the grid-connected bus frequency is greater than the first frequency threshold value and calculate a consistency factor of upward frequency modulation based on the real-time rotational speed and the rotational speed upper and lower limits of each wind turbine when the frequency is less than the second frequency threshold value.

The control module is configured to control each wind turbine to exchange the consistency factors with two adjacent wind turbines.

The support module is configured to control each wind turbine to combine its own consistency factors with the consistency factors of two adjacent wind turbines to generate consistency added power through a PI link to perform frequency support and add the consistency added power of the grid-forming wind turbine to the active power loop of a wind turbine controller to generate the phase angle.

According to another aspect of the disclosure, the disclosure further provides a wind farm including a memory and a processor. The memory stores a computer program. The processor implements the steps of the abovementioned method when executing the computer program.

According to another aspect of the disclosure, the disclosure further provides a computer-readable storage medium storing a computer program. The computer program performs the steps of the abovementioned method when being executed by a processor.

DESCRIPTION OF THE EMBODIMENTS

In order to make the objectives, technical solutions, and advantages of the disclosure clearer and more comprehensible, the disclosure is further described in detail with reference to the drawings and embodiments. It should be understood that the specific embodiments described herein serve to explain the invention merely and are not used to limit the invention. In addition, the technical features involved in the various embodiments of the invention described below can be combined with each other as long as the technical features do not conflict with each other.

Figure 1:
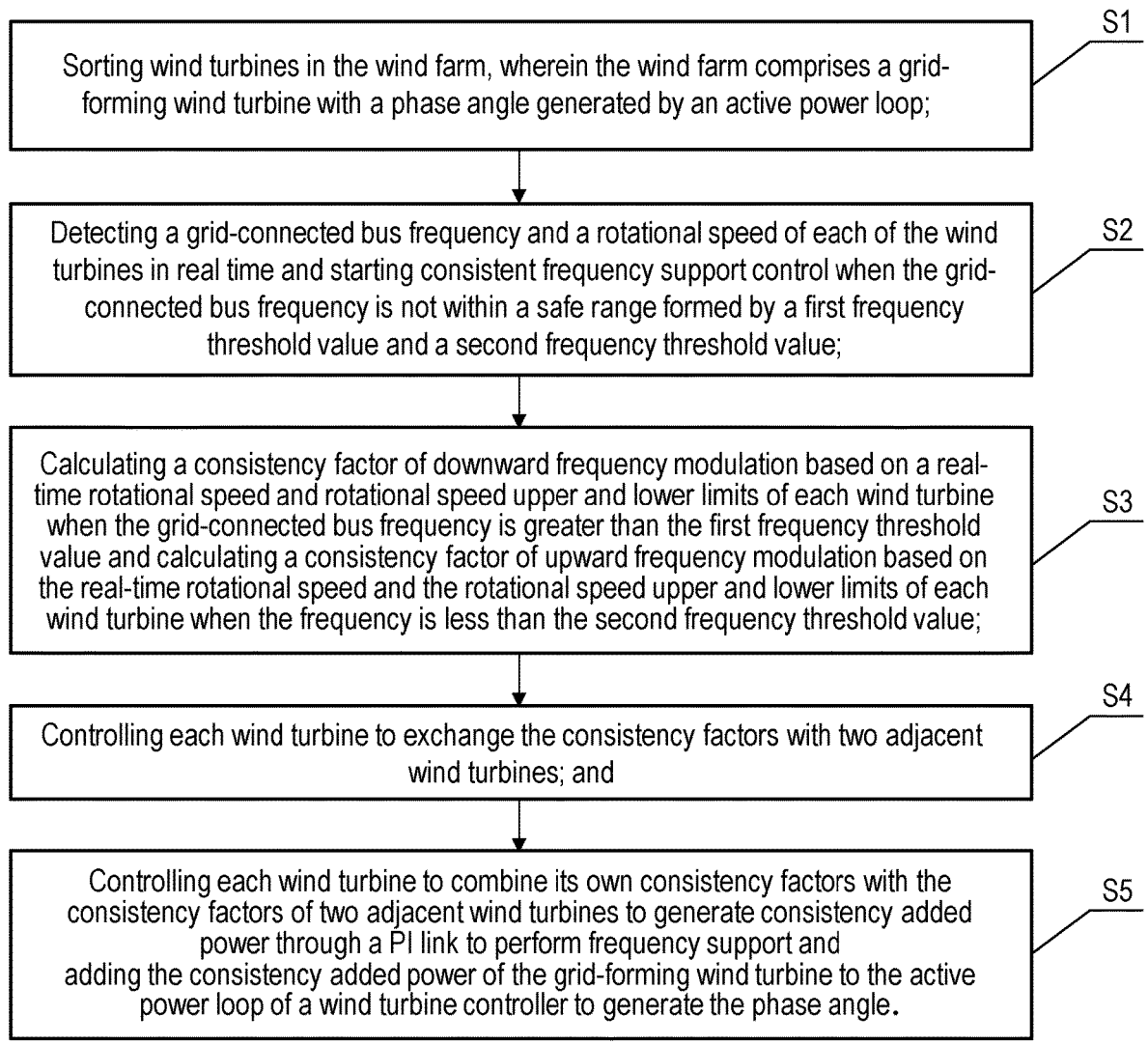
FIG. 1 is a frame diagram of a consistent frequency support method for a wind farm containing a grid-forming wind turbine in an embodiment of the disclosure.
Figure 2:
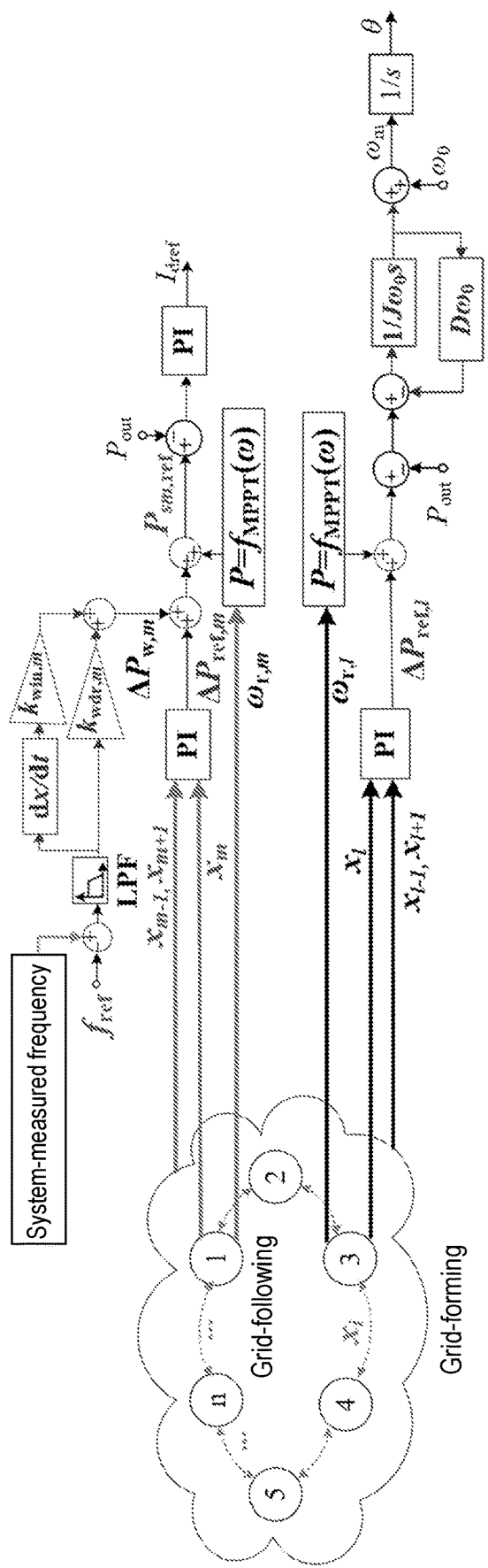
FIG. 2 is a schematic diagram of consistent frequency support control of the wind farm containing the grid-forming wind turbine.

As shown in FIG. 1, a consistent frequency support method for a wind farm containing a grid-forming wind turbine is provided and is applied to a wind farm containing a grid-forming wind turbine. A schematic diagram of consistent frequency support control of the wind farm containing the grid-forming wind turbine is shown in FIG. 2. Specific steps are provided as follows.

In S1, wind turbines in the wind farm are sorted. The wind farm includes a grid-forming wind turbine with a phase angle generated by an active power loop.

In S2, a grid-connected bus frequency and a rotational speed of each of the wind turbines are detected in real time, and consistent frequency support control is started when the grid-connected bus frequency is not within a safe range formed by a first frequency threshold value and a second frequency threshold value.

In S3, a consistency factor of downward frequency modulation is calculated based on a real-time rotational speed and rotational speed upper and lower limits of each wind turbine when the grid-connected bus frequency is greater than the first frequency threshold value, and a consistency factor of upward frequency modulation is calculated based on the real-time rotational speed and the rotational speed upper and lower limits of each wind turbine when the frequency is less than the second frequency threshold value.

In S4, each wind turbine is controlled to exchange the consistency factors with two adjacent wind turbines.

In S5, each wind turbine is controlled to combine its own consistency factors with the consistency factors of two adjacent wind turbines to generate consistency added power through a PI link to perform frequency support, and the consistency added power of the grid-forming wind turbine is added to the active power loop of a wind turbine controller to generate the phase angle.

In one of the embodiments, S1 includes the following. A wind turbine is selected and numbered as 1, communication time between wind turbine No. 1 and the remaining wind turbines is tested, and the wind turbine with the shortest communication time is numbered wind turbine No. 2. The communication time between wind turbine No. 2 and the remaining unnumbered wind turbines is tested, and the wind turbine with the shortest communication time is numbered as wind turbine No. 3 and so on to complete the numbering of all wind turbines in the wind farm.

In one of the embodiments, S2 includes the following. When the frequency is greater than the first frequency threshold value or less than the second frequency threshold value, the consistent frequency support control is started. Herein, the first frequency threshold value is 1.001 pu, and the second frequency threshold value is 0.999 pu.

In one of the embodiments, S2 includes the following. The method of calculating the consistency factor of downward frequency modulation is $$x_i = \frac{\omega_{r,i}^2 - \omega_{r,i0}^2}{\omega_{r,max}^2 - \omega_{r,i0}^2},$$

where $\omega_{r,i0}$ is a rotor speed of wind turbine i when the consistent frequency support control of the wind farm is started, $\omega_{r,i}$ is a real-time rotor speed of wind turbine i, and $\omega_{r,max}$ is a rotor speed upper limit. The method of calculating the consistency factor of upward frequency modulation is $$x_i = \frac{\omega_{r,i0}^2 - \omega_{r,i}^2}{\omega_{r,i0}^2 - \omega_{r,min}^2},$$

where $\omega_{r,min}$ is a rotor speed lower limit. Herein, the speed upper limit $\omega_{r,max}$ is 1.2 pu, and the speed lower limit $\omega_{r,max}$ is 0.7 pu.

In one of the embodiments, S4 includes the following. Each wind turbine is controlled to exchange the consistency factors with two adjacent wind turbines on the left and right, where wind turbine No. 1 exchanges the consistency factors with wind turbine No. n and wind turbine No. 2, wind turbine No. n exchanges the consistency factors with wind turbine No. 1 and wind turbine No. n−1, and n is the total number of wind turbines in the wind farm.

In one of the embodiments, the consistency added power of a grid-following wind turbine is added to a d-axis outer ring of the wind turbine controller to generate an active current $I_{dref}$. The consistency added power of the grid-forming wind turbine is added to the active power loop of a wind turbine controller to generate the phase angle θ.

In one of the embodiments, S5 includes the following. The method of generating the consistency added power is:

$$\Delta P_{ref,i}(t) = \begin{cases} k_{P,i} \sum_{j=i-1}^{i+1}(x_j - x_i) + k_{I,i} \int \sum_{j=i-1}^{i+1}(x_j - x_i) & (1 < i < n) \\ k_{P,i}(x_j - x_i) + k_{I,i} \int (x_j - x_i) & (i = 1; j = n, i+1), \\ k_{P,i}(x_j - x_i) + k_{I,i} \int (x_j - x_i) & (i = n; j = n-1, 1) \end{cases}$$

where $k_{p,i}$ is a proportional coefficient of a PI controller, and $k_{I,i}$ is an integral coefficient of the PI controller.

Figure 3A:
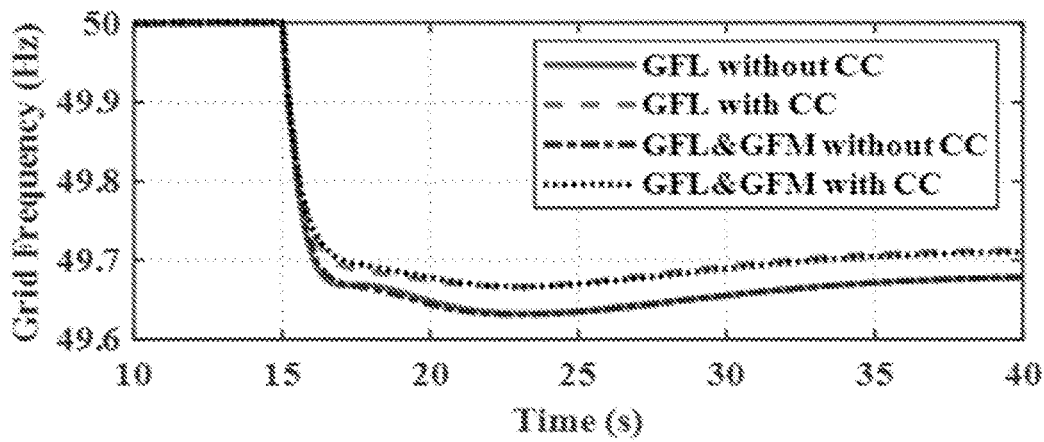
FIG. 3a illustrates simulation results of synchronizing power grid frequencies in an embodiment of the disclosure.
Figure 3B:
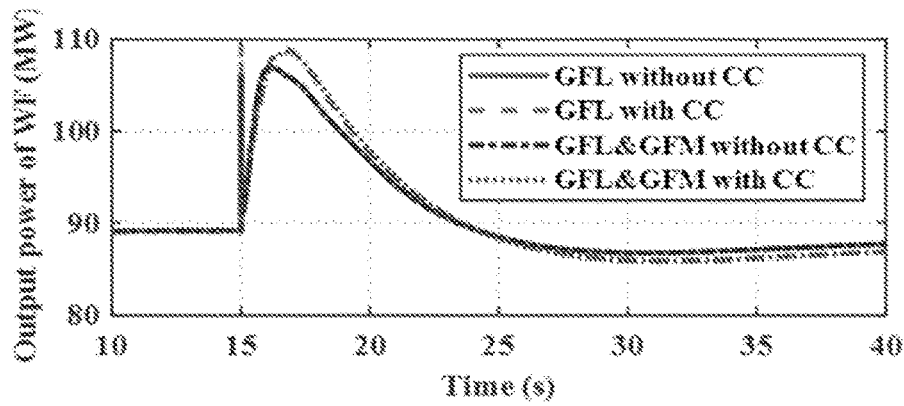
FIG. 3b illustrates simulation results of output power of the wind farm in an embodiment of the disclosure.

In order to verify the effectiveness of the method provided by the disclosure, a hybrid wind farm formed by 1 grid-forming wind turbine+4 grid-following wind turbines and a wind farm formed by 5 grid-following wind turbines are built on a Matlab/Simulink platform. Wind speeds of wind turbine 1 to wind turbine 5 are 0.95 pu, 0.95 pu, 0.92 pu, 0.90 pu, and 0.85 pu respectively. Rated output power of each wind turbine is 20 MW and a load is 350 WM. The load suddenly increases by 50 MW at 15 s. The grid frequency and wind farm output power are shown in FIG. 3a and FIG. 3b. GFL without CC, GFL with CC, GFL&GFM without CC, GFL&GFM with CC respectively represent a full grid-following wind farm without consistency control, a full grid-following wind farm with consistency control, a grid-following and grid-forming hybrid wind farm without consistency control, and a grid-following and grid-forming hybrid wind farm with consistency control. It can be seen that after consistency control is applied, the lowest point of the grid frequency increases, and the output characteristics of the grid-following wind farm and the hybrid wind farm are basically consistent.

Figure 4:
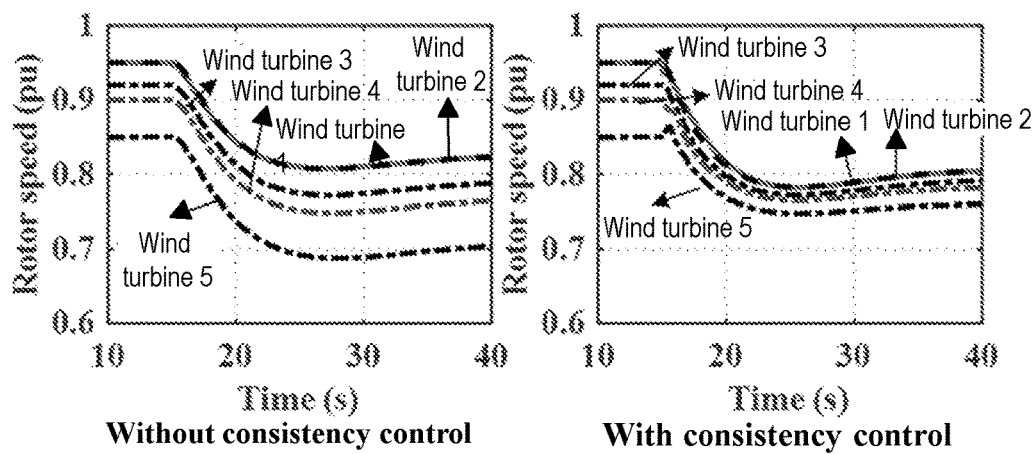
FIG. 4 illustrates simulation results of rotor speeds of wind turbines in an embodiment of the disclosure.

In the hybrid wind field formed by 1 grid-forming wind turbine+4 grid-following wind turbines, wind turbine 1 is the grid-forming wind turbine. No consistency control and consistency control are configured respectively. The rotor speed characteristics of the wind turbine are shown in FIG. 4. When consistency control is not configured, the rotational speed of wind turbine 5 is less than the limit of 0.7 pu, which triggers the wind turbine to exit operation. After consistency control is configured, the rotational speeds of all wind turbines tend to be consistent, and reasonable power distribution is thus achieved.

In general, the above technical solutions provided by the disclosure have the following beneficial effects compared with the related art.

(1) In the frequency support method for the wind farm provided by the disclosure, a state that can reflect the frequency modulation capability of each wind turbine is designed, measured, and recorded as the consistency factor of frequency modulation. Each wind turbine is controlled to exchange the consistency factors with two adjacent wind turbines on the left and right. Each wind turbine combines its own consistency factors with the consistency factors of two adjacent wind turbines to generate the consistent added power through the PI link and adjusts the real-time frequency modulation output based on the consistency added power. In this way, the states of the wind turbines in the wind farm are similar during the frequency support process, so that a reasonable distribution of frequency support power is achieved, and the lowest point of the grid frequency is prevented from increasing when the wind turbine output is excessive. Therefore, the technical problem of excessive wind turbine output due to poor overall frequency modulation capability of the current wind farms is solved.

(2) In the solution, by testing the shortest communication time between the wind turbines for numbering, the communication delay of the wind turbines during frequency modulation can be reduced, and the overall frequency modulation capability of the wind farm can be improved.

(3) In the solution, the numbers are set in a ring shape, and each wind turbine is controlled to exchange the consistency factors with the two adjacent wind turbines on the left and right. Wind turbine No. 1 exchanges the consistency factors with wind turbine No. n and wind turbine No. 2, and wind turbine No. n exchanges the consistency factors with wind turbine No. 1 and wind turbine No. n−1. In this way, most of the wind turbines can interact with the wind turbine with the shortest communication delay, so that the response time of frequency support control is shortened, and the frequency modulation capability of each wind turbine is improved.

(4) In the solution, the consistency factors designed based on the rotor speed can reflect the changes in the frequency modulation capability of each wind turbine. A larger consistency factor means less remaining frequency modulation capability.

(5) In the solution, by setting the consistency control startup threshold, the stability reduction caused by frequent startup of the controller can be avoided.

(6) In the solution, the consistency added power of the grid-following wind turbine is added to the d-axis outer ring of the wind turbine controller to generate the active current. The phase angle of the grid-following wind turbine is provided by the phase-locked loop. In this way, stable frequency support can be achieved for the wind farm including both the grid-following wind turbine and the grid-forming wind turbine.

(7) In the solution, by subjecting the consistency factors of adjacent wind turbines to PI control, the consistency factors of different wind turbines can be made consistent. In this way, the problem of unreasonable power distribution under the uniform control strategy is avoided, and the frequency support capacity of the wind farm is maximized.

A person having ordinary skill in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A frequency support method for a wind farm, comprising:

step 1: sorting wind turbines in the wind farm, wherein the wind farm comprises a grid-forming wind turbine with a phase angle generated by an active power loop, wherein the step 1 further comprises:

step 11: selecting a wind turbine and numbering the wind turbine as 1, testing communication time between wind turbine No. 1 and the remaining wind turbines, and numbering the wind turbine with the shortest communication time as wind turbine No. 2; and step 12: testing the communication time between wind turbine No. 2 and the remaining unnumbered wind turbines and numbering the wind turbine with the shortest communication time as wind turbine No. 3 and so on to complete the numbering of all wind turbines in the wind farm;

step 2: detecting a grid-connected bus frequency and a rotational speed of each of the wind turbines in real time and starting consistent frequency support control when the grid-connected bus frequency is not within a safe range formed by a first frequency threshold value and a second frequency threshold value, wherein the consistent frequency support control is further defined in step 3;

step 3: calculating a consistency factor of downward frequency modulation based on a real-time rotational speed and rotational speed upper and lower limits of each wind turbine when the grid-connected bus frequency is greater than the first frequency threshold value, and calculating a consistency factor of upward frequency modulation based on the real-time rotational speed and the rotational speed upper and lower limits of each wind turbine when the frequency is less than the second frequency threshold value;

step 4: controlling each wind turbine to exchange the consistency factors with two adjacent wind turbines; and step 5: controlling each wind turbine to combine its own consistency factors with the consistency factors of two adjacent wind turbines to generate consistency added power through a PI link to perform frequency support and adding the consistency added power of the grid-forming wind turbine to the active power loop of a wind turbine controller to generate the phase angle.

2. The frequency support method for the wind farm according to claim 1, wherein step 4 comprises:

controlling each wind turbine to exchange the consistency factors with two adjacent wind turbines on the left and right, wherein the wind turbine No. 1 exchanges the consistency factors with wind turbine No. n and the wind turbine No. 2, wind turbine No. n exchanges the consistency factors with wind turbine No. 1 and wind turbine No. n−1, and n is the total number of wind turbines in the wind farm.

3. The frequency support method for the wind farm according to claim 1, wherein step 3 comprises:

step 31: calculating the consistency factor of downward frequency modulation of each wind turbine through formula $$\omega_{r,i}^2 - \omega_{r,i0}^2$$

when the grid-connected bus frequency is greater than the first frequency threshold value; and step 32: calculating the consistency factor of upward frequency modulation of each wind turbine through formula $$\omega_{r,i0}^2 - \omega_{r,i}^2$$

when the frequency is less than the second frequency threshold value, wherein $\omega_{r,i0}$ is a rotor speed of wind turbine i when the consistent frequency support control of the wind farm is started, $\omega_{r,i}$ is a real-time rotor speed of wind turbine i, $\omega_{r,max}$ is a rotor speed upper limit, and $\omega_{r,min}$ is a rotor speed lower limit.

4. The frequency support method for the wind farm according to claim 3, wherein
the first frequency threshold value is set to 1.001 pu, and the second frequency threshold value is set to 0.999 pu.

5. The frequency support method for the wind farm according to claim 1, wherein step 5 further comprises:
adding the consistency added power of a grid-following wind turbine to a d-axis outer ring of the wind turbine controller to generate an active current, wherein the phase angle of the grid-following wind turbine is provided by a phase-locked loop.

6. The frequency support method for the wind farm according to claim 5, wherein the each wind turbine combining its own consistency factors with the consistency factors of two adjacent wind turbines to generate the consistency added power through the PI link comprises:
calculating the consistency added power $\Delta P_{ref,i}(t)$ of each wind turbine through the formula $$\Delta P_{ref,i}(t) = \begin{cases} k_{P,i}\sum_{j=i-1}^{i+1}(x_j - x_i) + k_{I,i}\int\sum_{j=i-1}^{i+1}(x_j - x_i) & (1 < i < n) \\ k_{P,i}(x_j - x_i) + k_{I,i}\int(x_j - x_i) & (i = 1; j = n, i+1) \\ k_{P,i}(x_j - x_i) + k_{I,i}\int(x_j - x_i) & (i = n; j = n-1, 1) \end{cases}$$

wherein $k_{p,i}$ is a proportional coefficient of a PI controller, and $k_{I,i}$ is an integral coefficient of the PI controller.

7. A frequency support device for a wind farm, comprising:
a sorting module configured to sort wind turbines in the wind farm, wherein the wind farm comprises a grid-forming wind turbine with a phase angle generated by an active power loop, wherein the sorting wind turbines comprises:
selecting a wind turbine and numbering the wind turbine as 1, testing communication time between wind turbine No. 1 and the remaining wind turbines, and numbering the wind turbine with the shortest communication time as wind turbine No. 2; and
testing the communication time between wind turbine No. 2 and the remaining unnumbered wind turbines and numbering the wind turbine with the shortest communication time as wind turbine No. 3 and so on to complete the numbering of all wind turbines in the wind farm;
a detection module configured to detect a grid-connected bus frequency and a rotational speed of each of the wind turbines in real time and start consistent frequency support control when the grid-connected bus frequency is not within a safe range formed by a first frequency threshold value and a second frequency threshold value, wherein the consistent frequency support control is further conducted by a calculation module;
the calculation module configured to calculate a consistency factor of downward frequency modulation based on a real-time rotational speed and rotational speed upper and lower limits of each wind turbine when the grid-connected bus frequency is greater than the first frequency threshold value, and calculate a consistency factor of upward frequency modulation based on the real-time rotational speed and the rotational speed upper and lower limits of each wind turbine when the frequency is less than the second frequency threshold value;
a control module configured to control each wind turbine to exchange the consistency factors with two adjacent wind turbines; and
a support module configured to control each wind turbine to combine its own consistency factors with the consistency factors of two adjacent wind turbines to generate consistency added power through a PI link to perform frequency support and add the consistency added power of the grid-forming wind turbine to the active power loop of a wind turbine controller to generate the phase angle.

8. A wind farm comprising a memory and a processor, wherein the memory stores a computer program, and the processor implement the steps of the method according to claim 1 when executing the computer program.

9. A wind farm comprising a memory and a processor, wherein the memory stores a computer program, and the processor implement the steps of the method according to claim 2 when executing the computer program.

10. A wind farm comprising a memory and a processor, wherein the memory stores a computer program, and the processor implement the steps of the method according to claim 3 when executing the computer program.

11. A wind farm comprising a memory and a processor, wherein the memory stores a computer program, and the processor implement the steps of the method according to claim 4 when executing the computer program.

12. A wind farm comprising a memory and a processor, wherein the memory stores a computer program, and the processor implement the steps of the method according to claim 5 when executing the computer program.

13. A wind farm comprising a memory and a processor, wherein the memory stores a computer program, and the processor implement the steps of the method according to claim 6 when executing the computer program.

14. A computer-readable storage medium storing a computer program, wherein the computer program implements the steps of the method according to claim 1 when being executed by a processor.

15. A computer-readable storage medium storing a computer program, wherein the computer program implements the steps of the method according to claim 2 when being executed by a processor.

16. A computer-readable storage medium storing a computer program, wherein the computer program implements the steps of the method according to claim 3 when being executed by a processor.

17. A computer-readable storage medium storing a computer program, wherein the computer program implements the steps of the method according to claim 4 when being executed by a processor.

* * * * *